(12) United States Patent
Lindemann

(10) Patent No.: US 10,885,358 B2
(45) Date of Patent: Jan. 5, 2021

(54) METHOD FOR DETECTING TRAFFIC SIGNS

(71) Applicant: Continental Automotive GmbH, Hannover (DE)

(72) Inventor: Robert Lindemann, Wiesbaden (DE)

(73) Assignee: Continental Automotive GmbH, Hannover (DE)

( * ) Notice: Subject to any disclaimer, the term of this patent is extended or adjusted under 35 U.S.C. 154(b) by 94 days.

(21) Appl. No.: 16/300,390

(22) PCT Filed: May 8, 2017

(86) PCT No.: PCT/EP2017/060894
§ 371 (c)(1),
(2) Date: Nov. 9, 2018

(87) PCT Pub. No.: WO2017/194457
PCT Pub. Date: Nov. 16, 2017

(65) Prior Publication Data
US 2019/0147257 A1    May 16, 2019

(30) Foreign Application Priority Data

May 10, 2016  (DE) ........................ 10 2016 208 025

(51) Int. Cl.
*G06K 9/00* (2006.01)
*G08G 1/01* (2006.01)
*G08G 1/00* (2006.01)

(52) U.S. Cl.
CPC ....... *G06K 9/00818* (2013.01); *G08G 1/0112* (2013.01); *G08G 1/205* (2013.01)

(58) Field of Classification Search
CPC ... G06K 9/00818; G08G 1/0112; G08G 1/205
(Continued)

(56) References Cited

U.S. PATENT DOCUMENTS 7,433,889 B1 * 10/2008 Barton .................... G08G 1/20
8,041,080 B2   10/2011 Porikli et al.
(Continued)

FOREIGN PATENT DOCUMENTS

CN       101275841 A    10/2008
DE    102009018073 A1    1/2010
(Continued)

OTHER PUBLICATIONS

Sergio R Madeira et al: "Automatic Traffic Signs Inventory Using a Mobile Mapping System for GIS applications",Jan. 1, 2005 (Jan. 1, 2005), XP055395052, Gefunden im Internet: URL:https://pdfs.semanticscholar.org/la8a/7193d8b83cfc73465e23e416b4bd34fdee76.pdf?ga=2.141784176.395923683.1501578861-655833872.1499160678[gefunden am Aug. 1, 2017] Zusammenfassung Kapitel: Introduction Kapitel: Automatic Traffic sign Recognition.
(Continued)

Primary Examiner — Stephen P Coleman

(57) ABSTRACT

The limitation, which applies when capturing traffic signs in a conventional manner using a camera which is oriented to the front with respect to the vehicle, to capturing traffic signs that are located ahead in the driving direction and the unique association between traffic signs that apply only to one direction and the driving direction of the capturing vehicle are eliminated by way of a camera that is oriented to the rear with respect to the vehicle, for example a rear-view camera of the vehicle, also being operated during forward travel in order to also capture traffic signs that apply to the opposite direction and are located behind the vehicle at the time they are captured, and the position of said traffic signs, and by way of data sets generated therefrom being transmitted to the database together with the data sets generated by means of the front camera.

11 Claims, 4 Drawing Sheets

(58) Field of Classification Search
USPC .......................................................... 382/103
See application file for complete search history.

(56) References Cited

U.S. PATENT DOCUMENTS

| | | | |
|---|---|---|---|
| 2006/0267502 A1* | 11/2006 | Kubota | B60Q 1/143 |
| | | | 315/82 |
| 2008/0013789 A1* | 1/2008 | Shima | G06K 9/00798 |
| | | | 382/104 |
| 2008/0240573 A1 | 10/2008 | Nakamura et al. | |
| 2014/0015973 A1 | 1/2014 | Vasquez et al. | |
| 2015/0345974 A1* | 12/2015 | Takahashi | G06K 9/00818 |
| | | | 701/461 |
| 2016/0049076 A1 | 2/2016 | Waite | |
| 2016/0343253 A1 | 11/2016 | Imai | |
| 2018/0060986 A1 | 3/2018 | Suzuki et al. | |

FOREIGN PATENT DOCUMENTS

| | | |
|---|---|---|
| DE | 102014201158 A1 | 7/2015 |
| DE | 102014223747 A1 | 5/2016 |
| EP | 1975565 A2 | 10/2008 |
| EP | 2195613 B1 | 3/2016 |
| JP | 2008250687 A | 10/2008 |
| JP | 2009193257 A | 8/2009 |
| JP | 2013008070 A | 1/2013 |
| JP | 2015121952 A | 7/2015 |
| WO | 2016/132587 A1 | 8/2016 |

OTHER PUBLICATIONS

Segvic S et al: "A computer vision assisted geoinformation inventory for traffic infrastructure",Intelligent Transportation Systems (ITSC), 2010 13th International IEEE Conference on, IEEE, Piscataway, NJ, USA, Sep. 19, 2010 (Sep. 19, 2010), Seiten 66-73, XP031792535, ISBN: 978-1-4244-7657-2 das ganze Dokument.
International Search Report and Written Opinion dated Aug. 8, 2017 from corresponding International Patent Application No. PCT/EP2017/060894.
Office Action dated Mar. 6, 2017 from corresponding German Patent Application No. 10 2016 208 025.3.

* cited by examiner

METHOD FOR DETECTING TRAFFIC SIGNS

BACKGROUND

The present invention relates to the capturing of the content and the placement site of traffic signs.

PRIOR ART

Capturing traffic signs using cameras for immediate display and/or for producing and updating electronic road maps is already prior art nowadays. However, it is relatively easy, especially when traffic signs that have been captured using cameras and geo-localization are transmitted to a database outside the vehicle, to determine a current direction of travel and a position of the capturing vehicle and possibly to estimate a future position or path of travel. Drivers of the capturing vehicles can consider this a risk or limitation to privacy and consequently not accept such a function, as a result of which the database outside the vehicle is not frequently provided with current data.

Problem

The currently conventional camera arrangement for capturing traffic signs can recognize only traffic signs that are located ahead in the driving direction.

Many drivers also wish to avoid the creation of individual driving profiles or the ascertainment of frequently visited locations on the basis of traffic signs that are captured during travel and other driving route properties and could object to participation in the capturing. One possible solution for this problem is given in the German patent application with the application number 10 2016 207 984.0, although this solution only works to a limited degree in the case of capturing traffic signs that apply in each case only to one direction or can delay the transmission of driving route data in this case until they are no longer particularly current.

Terminology Definition

In the context of this description, a periodic determination of a geographic position of the vehicle is understood to mean a determination of the vehicle position in a manner such that times or places of the periodic capturing of the vehicle position are sufficiently close to one another to record the path of travel in a digital map and vehicle positions located therebetween may be ascertained by interpolation. An interpolation can be performed here for example using, inter alia, data of an odometer or of a speedometer and the time period at one or more times of the position determination. A continuous or quasi-continuous determination of the geographic position can also be performed by way of a periodic determination of the vehicle position at sufficiently short time intervals and subsequent interpolation.

BRIEF SUMMARY

It is an object of the present invention to use further sensors provided in vehicles to create and update electronic road maps while making the creation of driving profiles on the basis of corresponding data that have been transmitted to a database outside the vehicle more difficult.

Solution

The limitation, which applies when capturing traffic signs in a conventional manner using a camera which is oriented to the front with respect to the vehicle, to capturing traffic signs that are located ahead in the driving direction and the unique association between traffic signs that apply only to one direction and the driving direction of the capturing vehicle are eliminated by way of a camera that is oriented to the rear with respect to the vehicle, for example a rear-view camera of the vehicle, also being operated during forward travel in order to also capture traffic signs that apply to the opposite direction and are located behind the vehicle at the time they are captured, and the position of said traffic signs, and by way of data sets generated therefrom being transmitted to the database together with the data sets generated by means of the front camera. The known methods for detecting and capturing traffic signs for the camera pointing forward can be used in an analogous manner for the detection and capturing of traffic signs in the images of a camera that points rearward, as can known methods for determining the geographic position of the vehicle.

In accordance with a first aspect of the method according to the invention for capturing traffic signs and the placement site of said traffic signs by way of a driving vehicle, the geographic position of the vehicle is periodically or continuously captured and a first camera that is oriented to the rear with respect to the vehicle records images. The images of the first camera are passed on to a traffic sign recognition means. If a traffic sign has been recognized, information representing the recognized traffic sign and an associated geographic position are stored in a database. The information representing the traffic sign comprises at least the semantic content of the traffic sign, that is to say the meaning thereof for a driver of the vehicle.

The placement site of the traffic sign can be determined for example from a change in the location at which the traffic sign is imaged in sequential images of the camera, from the position and speed of the vehicle, the known installation position and the known optical properties of the camera. If the traffic sign is situated in a bend, it is also possible to take into account a steering angle when determining the position, because, depending on the bend radius and the direction of the bend, the position of the traffic sign can change to different extents in sequential images at constant speed. A lateral distance of the traffic sign from the road and the relative location thereof can also be ascertained in this way.

The first camera can be, for example, a camera for monitoring reverse travel, which is in any case present in a vehicle and the images of which are shown to a driver on a display during reverse travel. When using the camera in accordance with the invention during forward travel, preferably no images of the camera are shown on the display so as not to distract the driver.

In accordance with a second aspect of the method, a second camera of the vehicle, which is oriented to the front with respect to the vehicle, records images during travel which are passed on to an image recognition means. The image recognition means analyzes an image region located in the region of the opposite lane for objects having the typical shape of traffic signs. The content of traffic signs is not necessarily uniquely associated with the shape, and as a result it is not always possible in particular in the case of traffic signs that are recognized from behind to derive the content of the traffic sign relevant for a driver of a vehicle. In order to facilitate the re-identification of the candidate in the images of the first camera and to speed up the recognition of the traffic sign, an estimate is produced as to the time at which the candidate enters the capturing region of the first camera and the location in the image at which entry occurs.

In accordance with a refinement of the second aspect of the method, for the estimation, a candidate for a traffic sign that has been recognized by its shape is marked and the position thereof during the further approach of the vehicle to the candidate is tracked in the images of the second camera. Since the capturing regions, the installation locations and the optical properties of the second camera, which points forward, and the first camera, which points rearward, are known, it is possible to estimate, for example by using the current driving speed and possibly a steering angle, the time at which a candidate leaving the capturing region of the second camera enters the capturing region of the first camera. The estimate can be produced in a similar way as before when ascertaining the placement site. If the lateral distance and the relative location of the traffic sign are known from the estimate, it is also possible to estimate the location in the image at which the candidate is likely to be imaged upon entering the capturing region of the first camera. The re-identification of the candidate in images recorded by the rear-view camera can consequently already begin at the correct location in the image and be accelerated, and it is possible to start the validation of the candidate as a traffic sign and the recognition of the content of the traffic sign earlier. This is advantageous in particular at higher driving speeds of the vehicle, because the increasing distance of the vehicle from the stationary traffic sign means that the traffic sign is imaged by a decreasing number of pixels in successive images of the rear-view camera, with the result that the recognition accuracy can decrease. This is especially true if the candidate is entirely or partially blocked in some of the images by oncoming vehicles. In this refinement, the steering angle can also be captured to take account of the varying time intervals during cornering between leaving the capturing region of the second camera and entering the capturing region of the first camera. For example, in right-hand traffic, the candidate enters the capturing region of the camera oriented to the rear faster on right turns than on left turns.

In accordance with a refinement of the second aspect of the method, the first camera begins recording images and/or performing the traffic sign recognition only from the time at which a candidate enters the capturing region of said camera. The expression "from the time" in this case also comprises activation of the camera or traffic sign recognition taking place even just before the candidate enters the capturing region of the first camera. This activation ahead of time can be necessary, depending on the time it takes for the components involved in the method to achieve full operational readiness, to ensure that the camera and possibly the apparatus for traffic sign recognition are ready and fully functional in time for the entry of the candidate into the capturing region. This aspect of the method can be advantageous if the activation of the camera and of the apparatus for traffic sign recognition and the performance of the traffic sign recognition take less time than passes between the successive entry of two candidates into the capturing region of the camera oriented to the rear. It is thus possible to operate the camera or the apparatus for traffic sign recognition only when a traffic sign to be recognized is actually present, and by setting the camera or the recognition apparatus into a rest state, energy can be saved.

In accordance with a refinement of the previously illustrated aspect, in addition to the camera, the determination of the geographic position of the vehicle is also only activated once a candidate has been identified by the second camera and the image recognition. This aspect can be applied when a position determination is effected sufficiently quickly after the activation. Once the position determination for a traffic sign that has been recognized by the image recognition for images of the first camera has taken place and is complete, the apparatus for position determination can be deactivated again or placed in an energy-saving operating mode.

In accordance with a refinement of the second aspect of the method, the actual placement site of a validated traffic sign is determined from the time period during which the candidate was neither in the capturing region of the second camera nor in the capturing region of the first camera. For this determination, the known optical properties of the first and of the second camera, the installation locations thereof in the vehicle, the known distance between the installation locations of the cameras, the driving speed and the geographic positions of the vehicle ascertained during travel are used. This aspect exploits the fact that, when the geographic position of the vehicle is known, the position of an object located exactly laterally with respect to the vehicle is able to be determined more precisely than if the object were located laterally ahead of or behind the vehicle. If an object is located laterally ahead of or behind the vehicle, a possibly inaccurate calculation of the angle between the vehicle longitudinal axis and the object and a distance between vehicle and object that has possibly not been determined exactly result in an additional error in the determination of the position of the object from the known position of the vehicle.

In accordance with a refinement of the first or second aspect of the method, the information representing a recognized traffic sign and the associated geographic position are stored in a database in the vehicle or a database outside the vehicle. For storage in a database outside the vehicle, communication with the database outside the vehicle takes place via a wireless communication link.

An apparatus, arranged in a vehicle, for capturing traffic signs and the placement site thereof in accordance with the first aspect of the method comprises means for periodically or continuously determining a geographic position of the vehicle, a first camera which is oriented to the rear with respect to the vehicle, means for performing traffic sign recognition for the images of the first camera, and means for storing information representing traffic signs and associated geographic positions.

An apparatus, arranged in a vehicle, for capturing traffic signs and the placement site thereof in accordance with the second aspect of the method comprises, in addition to the previously described apparatus, a second camera which is oriented to the front with respect to the vehicle, means for performing image recognition in an image region, situated in the region of the opposite lane, of the images of the second camera, and means for estimating the time at which a candidate enters the capturing region of the first camera and the location in the image at which entry occurs. The means for performing image recognition are adapted to mark objects having a typical shape of traffic signs as candidates.

In one embodiment of the apparatus, no images of the first camera are reproduced during forward travel of the vehicle on a display unit that is connected to the first camera. By contrast, images of the first camera are reproduced during reverse travel if the camera is also provided in the vehicle for monitoring reverse travel.

In principle, the method can also be performed during reverse travel of the vehicle if traffic signs are placed along the distance that is traveled in reverse. In this case, traffic sign recognition is performed for the images of the first camera and there is also possibly a representation of the images of the first camera on an associated display unit.

The method allows capturing of both traffic signs that apply to the driven lane and traffic signs that apply to the oncoming lane. Capturing of traffic signs that apply to both driving directions during travel produces a total data set that, with appropriate processing, can make reconstruction of an individual journey more difficult.

BRIEF DESCRIPTION OF THE DRAWINGS

Aspects of the invention will be described below with reference to the drawing. In the drawing.

DETAILED DESCRIPTION

Figure 1:
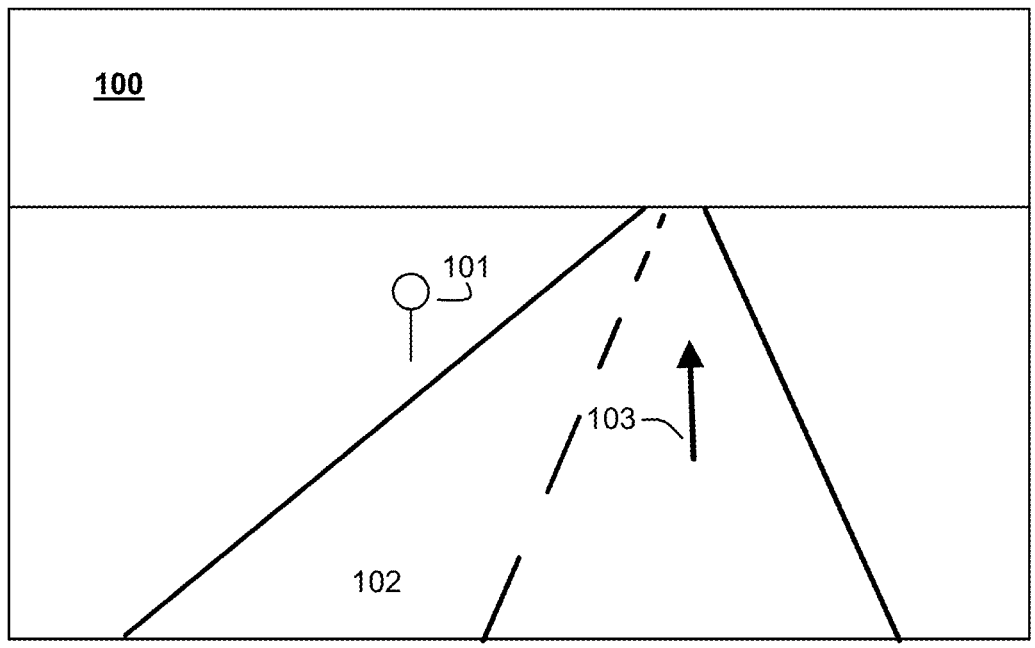
FIG. 1 shows an exemplary image, taken by a camera pointing forward with respect to a vehicle, of a traffic sign that applies to the opposite direction.

In the figures of the drawing, identical or similar elements are provided with identical reference signs.

FIG. 1 shows an exemplary image 100, taken by a camera pointing forward with respect to a vehicle, of a traffic sign 101 that applies to the opposite direction. The vehicle, which is not shown in the figure, is driving in the right-hand lane of the road 102. The direction of travel is indicated by the arrow 103. The content of the traffic sign 101 cannot be determined exactly merely by way of its shape, because a plurality of traffic signs have a circular basic shape. However, it can be identified as being a candidate for a possible traffic sign, for example in accordance with an aspect of the invention that is described in more detail with reference to FIG. 5.

Figure 2:
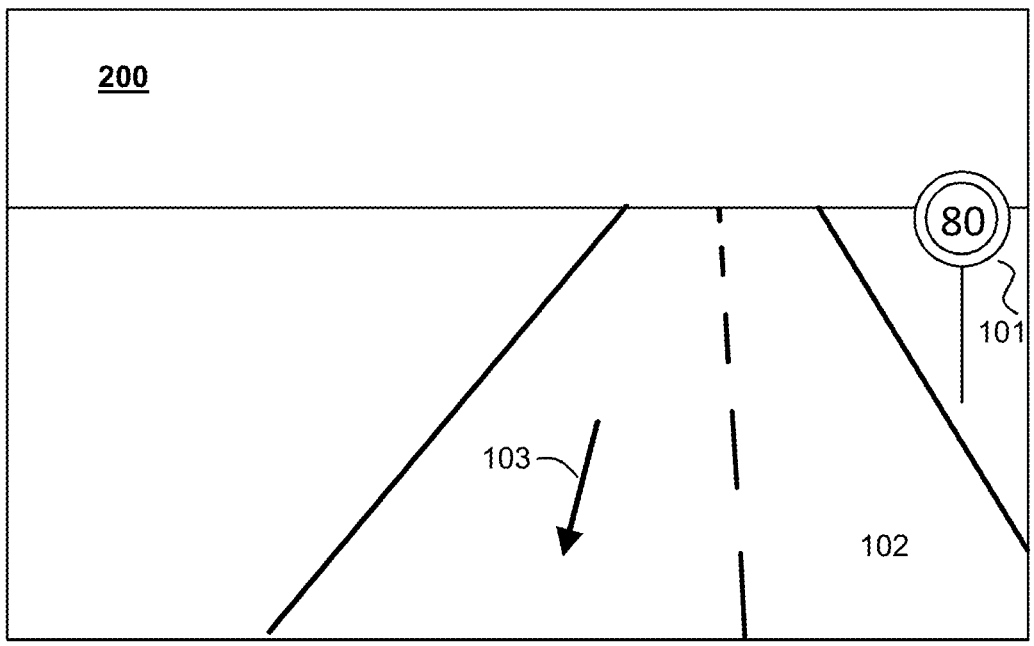
FIG. 2 shows an exemplary image, taken by a camera pointing rearward with respect to the vehicle, of the traffic sign shown in FIG. 1 after it has been passed.

FIG. 2 shows an exemplary image 200, taken by a camera pointing rearward with respect to the vehicle, with the traffic sign 101 shown in FIG. 1 after it has been passed. The vehicle is moving in the lane of the road 102, situated on the left in the image, toward the viewer, as indicated by the arrow 103. The content of the traffic sign 101 is now clearly recognizable—it shows a speed limit of 80 km/h. A process, applied to the image, for traffic sign recognition can thus identify the traffic sign that applies to the opposite direction and link it to a placement site that was captured as the vehicle drove past. This data set can then be stored in a database and processed further.

Figure 3:
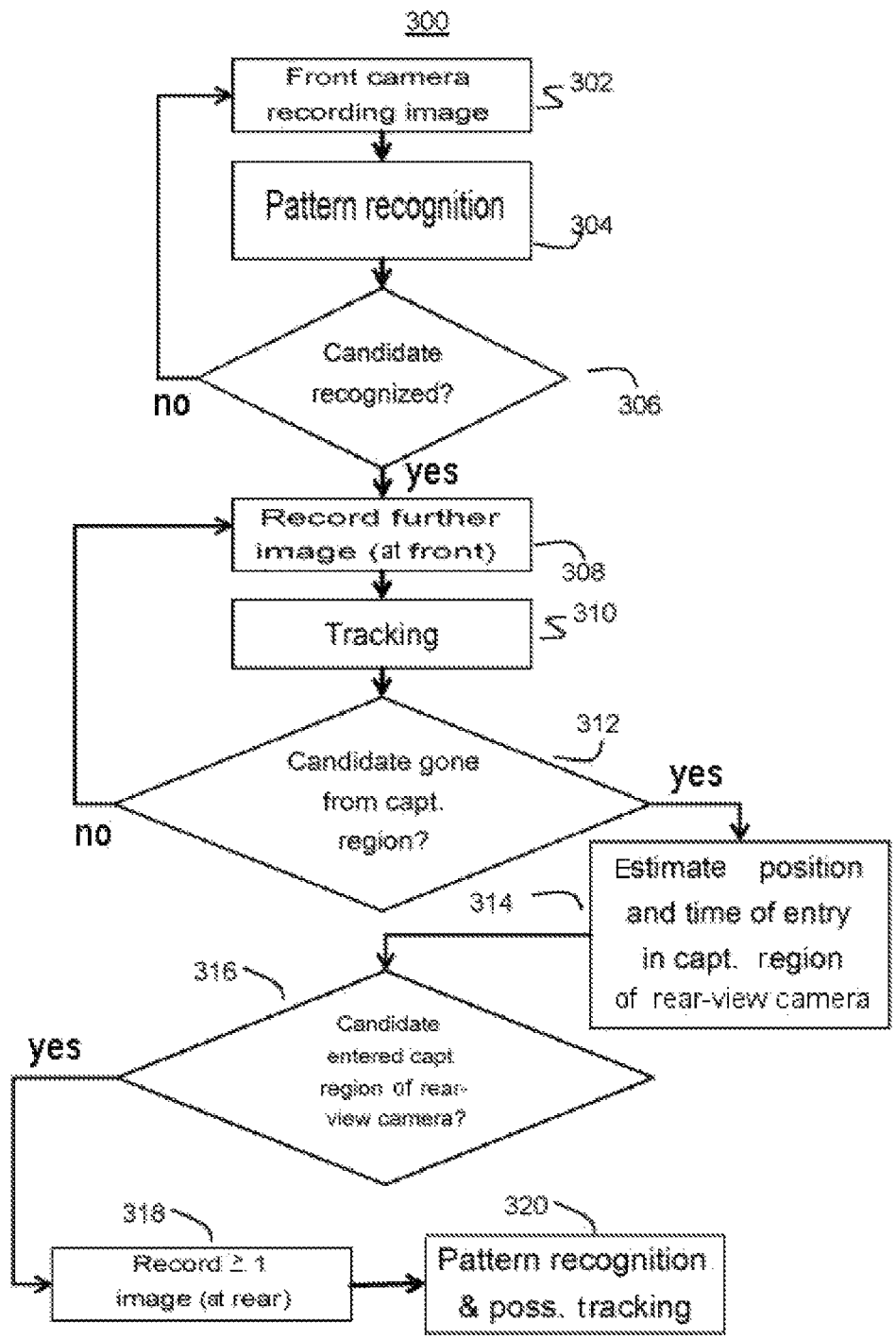
FIG. 3 shows an exemplary method sequence of an aspect of the method according to the invention.

FIG. 3 shows an exemplary method sequence of an aspect of the method 300 according to the invention. In step 302, the camera 302 oriented to the front records at least one image, which is supplied to a pattern recognition in step 304. The pattern recognition checks the image for any traffic signs placed at the opposite lane that apply to the opposite direction. If a possible candidate is recognized, "yes" branch of step 306, one or more further images are recorded by the camera, step 308, in which the candidate is detected and any change in position thereof in the image section is tracked, step 310. If no candidate is recognized, "no" branch of the step, further images are again recorded with the camera, but these are supplied to the pattern recognition in step 304. It should be noted that it is also possible, when a candidate is recognized in step 306, that further images are supplied to the pattern recognition in step 304, for example in order to recognize further candidates, while one or more previously recognized candidates are tracked. Recording further images and tracking are continued for each candidate, "no" branch of step 312, until the candidate is no longer located in the capturing region of the camera oriented to the front, "yes" branch of step 312. In this case, the geo-position and the time at which the capturing region of the camera oriented to the front is left are stored and the geo-position and the time at which the candidate enters the capturing region of the camera oriented to the rear is estimated, step 314. When the candidate has entered, according to the estimation, the capturing region of the camera oriented to the rear, "yes" branch of step 316, at least one image is recorded by the camera oriented to the rear, and is supplied to a pattern recognition, step 320. If not, waiting continues (not illustrated in the figure). If the pattern recognition 320 confirms the candidate as a traffic sign, the content of the now visible traffic sign is recognized and assigned to an associated placement site (not shown in the figure). For determining the placement site and for other purposes, it is also possible to continue tracking after the traffic sign has been recognized.

Figure 4:
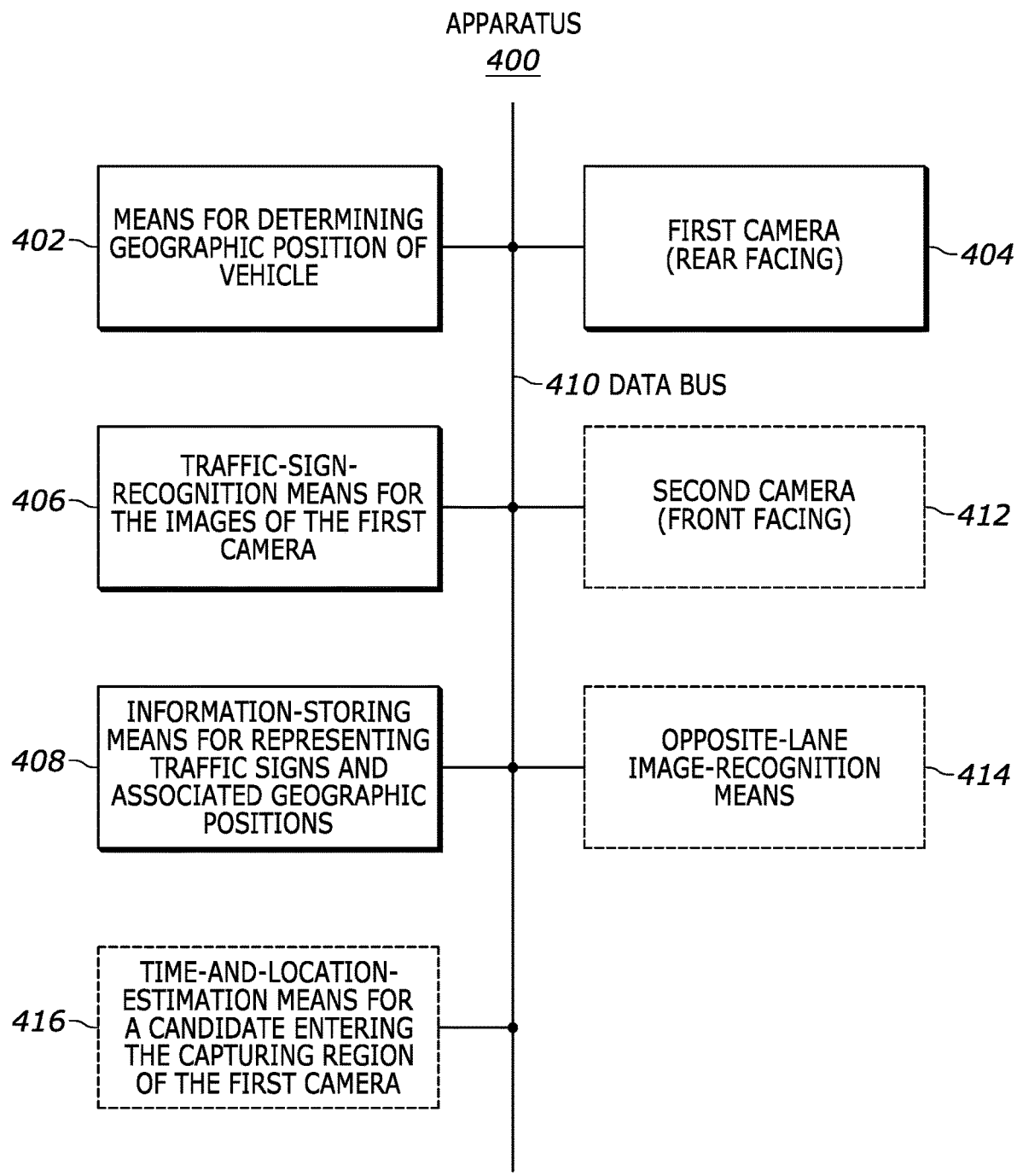
FIG. 4 shows an exemplary schematic overview of an apparatus for performing one or more aspects of the method according to the invention.

FIG. 4 shows an exemplary schematic overview of an apparatus 400 for performing one or more aspects of the method according to the invention. Means 402 for periodically or continuously determining a geographic position of the vehicle, a first camera 404 oriented to the rear with respect to the vehicle, means 406 for performing traffic sign recognition for the images of the first camera, and means 408 for storing information representing traffic signs and associated geographic positions are connected communicatively via at least one data bus 410. The apparatus optionally has, for some aspects of the method, a second camera 412 oriented to the front with respect to the vehicle, means 414 for performing image recognition in an image region, situated in the region of the opposite lane, of the images of the second camera, and means 416 for estimating the time at which a candidate enters the capturing region of the first camera and the location in the image at which entry occurs. The optionally provided means are illustrated in the figure by way of dashed lines.

One or more of the above-mentioned means can have one or more microprocessors that are connected to a corresponding main memory and possibly a non-volatile memory. The non-volatile memory here stores computer program commands that, when executed by the microprocessor with access to the main memory, provide the function of the means or perform the method steps to be performed by the means. Several of the means can be formed here by respective sets of computer program commands executed by the same microprocessor. Method steps that are applied to images both of the first camera and of the second camera, or are performed therefor, can also be performed in a single means that is suitable for this purpose, for example by sequential processing or alternating processing of individual partial steps or partial images.

Figure 5:
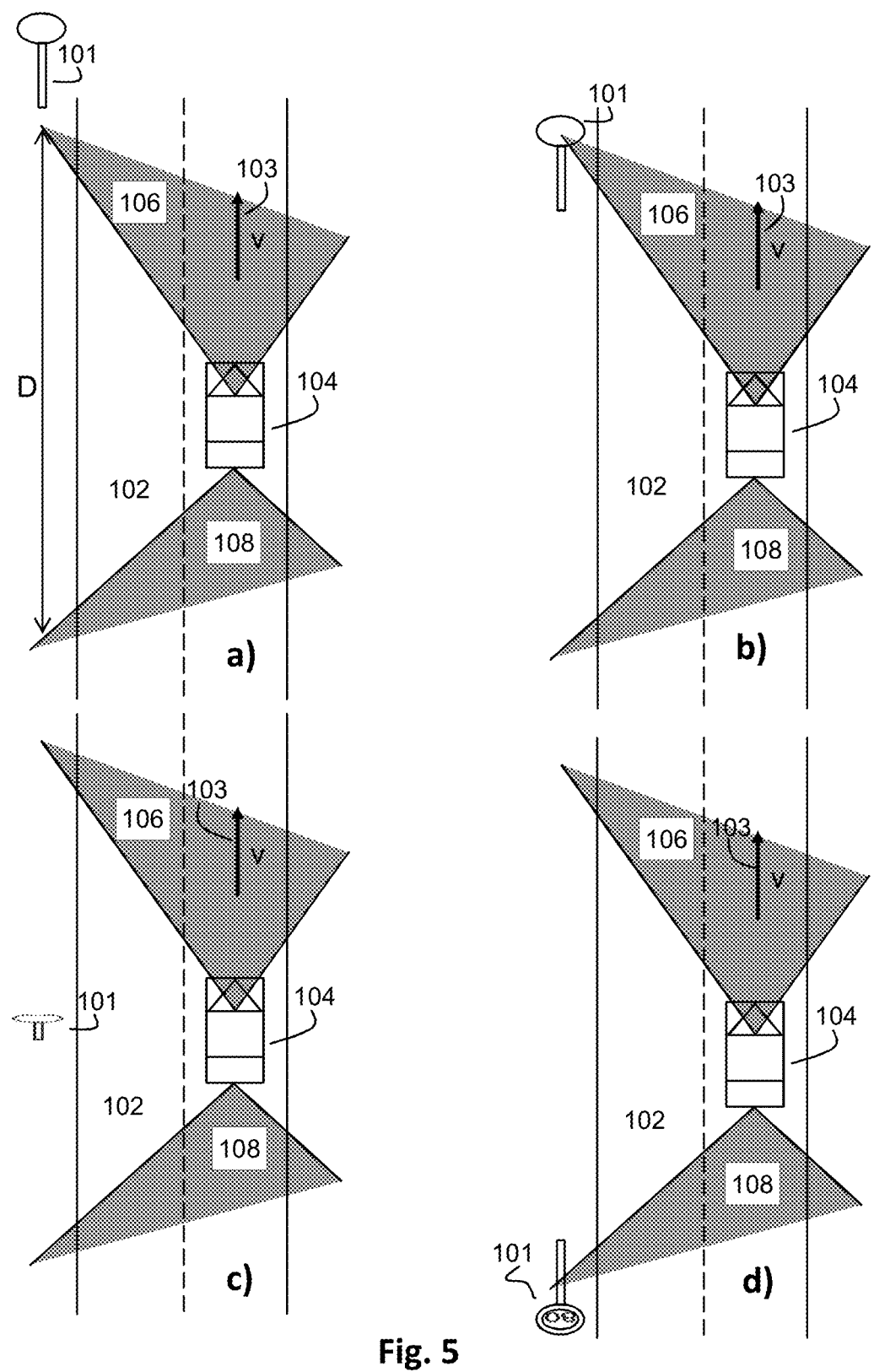
FIG. 5 shows four schematic representations, a), b), c), and d), of a road with a traffic sign at different times during the performance of an aspect of the method according to the invention.

The individual images a)-d) of FIG. 5 each show a schematic illustration of a road with a vehicle and a traffic sign at different times during the performance of one aspect of the method according to the invention.

In image a) of FIG. 5, a vehicle 104 is driving in the right-hand lane of a road 102. The direction of travel is indicated by the arrow 103, the index v at the arrow 103 representing a driving speed of the vehicle 104. Gray fields 106 and 108 indicate the capturing regions of a respective camera of the vehicle (not shown in the figure) that is oriented to the front or the rear in the driving direction. The capturing regions 106 and 108 extend beyond the gray region in the continuation of the lateral boundary lines. In the capturing region 106 of the camera oriented to the front, a traffic sign 101 that applies to the opposite direction is placed next to the lane, without the content of said traffic sign being able to be uniquely determined from the rear. According to an aspect of the method, the traffic sign is marked as a candidate and tracked in subsequent images, i.e. the respective position thereof in a respectively latest image is determined.

In image b) of FIG. 5, the vehicle 104 has approached the traffic sign 101 to such an extent that it is no longer completely located within the capturing region 106 of the camera oriented to the front. Further tracking of the position of the traffic sign 101 in the images of the camera oriented to the front is no longer possible or is about to be no longer possible. From the progress of the tracking of the traffic sign 101 in the images of the camera oriented to the front up to this point and from known optical properties and installation locations of the cameras, it is possible to produce an estimate as to the time at which the traffic sign 101 will enter the capturing region 108 of the camera oriented to the rear and also the location in the image thereof at which this will occur. The angles of the capturing regions 106 and 108 with respect to a longitudinal axis of the vehicle are known. It is possible, based on the likewise known distance between the two cameras and an estimation of the lateral distance of the traffic sign from the vehicle, to ascertain a distance D that must be traveled before the traffic sign 101 enters the capturing region of the camera oriented to the rear. The distance D is indicated by way of example in image a) of FIG. 5. The lateral distance of the traffic sign 101 from the vehicle 104 can be determined, for example, from the change in position of the candidate over two or more sequential images of the camera oriented to the front, the known time interval between the images, the known optical properties of the camera, and the driving speed of the vehicle. If the driving path is not straight, a corresponding steering angle can also be taken into account (not shown in the figure).

In image d) of FIG. 5, the vehicle 104 has passed the traffic sign 101, and the traffic sign 101 has entered the capturing region of the camera oriented to the rear. The content of the traffic sign is now recognizable on the images thereof and can be determined using an apparatus for traffic sign recognition (not shown in the figure). The placement site of the traffic sign 101 can be determined either from the known optical properties of the camera oriented to the front or the camera oriented to the rear and the known geographic position of the vehicle, e.g. for the candidate when leaving the capturing region of the camera oriented to the front, or for the candidate when entering the capturing region of the camera oriented to the rear. As soon as a traffic sign recognition has been successfully performed, the position of the now confirmed candidate can be assigned to the traffic sign.

The point in time shown in image c) of FIG. 5 lies before the point in time shown in image d) of figure. In image c) of FIG. 5, the vehicle 104 has only arrived at the level of the traffic sign 101 during its passage, and the traffic sign 101 is not situated in any of the capturing regions of the cameras. However, the traffic sign 101 was identified as a candidate before it dropped out of the capturing region of the camera oriented to the front. In order to be able to establish an exact position of the traffic sign—after a later confirmation of the candidate—the time that passes between the leaving of the capturing region of the camera oriented to the front and the entry into the capturing region of the camera oriented to the rear is measured. In addition, the speed during this time is captured, either as an average speed or as a record of instantaneous speeds over time. The aperture angles of the capturing regions of the two cameras are known. It is thus possible to determine a time at which the candidate is situated laterally level with the vehicle 104. The position of the vehicle at this time is determined and stored. If a candidate after entering the capturing region of the camera oriented to the rear is confirmed as a valid traffic sign, the previously determined and stored position can be assigned thereto.

The invention claimed is:

1. A method for capturing traffic signs and the placement site of said traffic signs by a driving vehicle, comprising:
   periodically or continuously determining a geographic position of the vehicle, respect to the vehicle,
   performing image recognition on the images recorded using the first camera in an image region located in a region of the opposite lane, wherein the image recognition marks objects having a typical shape of traffic signs as candidates,
   estimating a time at which one of the candidates enters the capturing region of a second camera and the location in the image at which entry occurs;
   recording images using the second camera which is oriented to the rear with respect to the vehicle,
   performing traffic sign recognition for the images of the second camera, and
   if a traffic sign has been recognized, storing information representing the recognized traffic sign and an associated geographic position in a database;
   wherein estimating the time at which the candidate enters the capturing region of the second camera comprises:
   tracking the position of the candidate in the images of the first camera as the vehicle continues to approach the candidate, and
   determining a time of entry into the capturing region of the second camera from a speed of the vehicle and a steering angle of the vehicle, and from the optical properties of the first and of the second camera and the installation positions thereof in the vehicle.

2. The method as claimed in claim 1, characterized in that the recording of images with the second camera and/or the performing of the traffic sign recognition for images of the second camera is operated or performed only from the time at which the candidate enters the capturing region of the first camera.

3. The method as claimed in claim 1, characterized in that the actual placement site of a validated traffic sign is determined from the time during which the candidate was neither in the capturing region of the second camera nor in that of the first camera, the known optical properties of the first and of the second camera and the installation locations thereof in the vehicle, the driving speed, and the geographic positions of the vehicle ascertained during travel.

4. The method as claimed in claim 1, characterized in that the recording of images with the second camera and/or the performing of the traffic sign recognition for images of the second camera is operated or performed only from the time at which the candidate enters the capturing region of the second camera.

5. The method as claimed in claim 1, characterized in that the actual placement site of a validated traffic sign is determined from the time during which the candidate was neither in the capturing region of the second camera nor in that of the first camera, the known optical properties of the first and of the second camera and the installation locations thereof in the vehicle, the driving speed, and the geographic positions of the vehicle ascertained during travel.

6. The method as claimed in claim 1, wherein storing is effected in a database in the vehicle and/or in a database outside the vehicle, wherein communication with the database outside the vehicle is effected via a wireless communication link.

7. An apparatus for capturing traffic signs and the placement sites thereof, wherein the apparatus is arranged on or in a vehicle, comprising:
  means for periodically or continuously determining a geographic position of the vehicle,
  a first camera which is oriented to the front with respect to the vehicle,
  means for performing image recognition in an image region, located in the region of the opposite lane, of the images of the first camera, wherein the image recognition marks objects having a typical shape of traffic signs as candidates,
  means for estimating the time at which a candidate enters the capturing region of a second camera and the location in the image at which entry occurs,
wherein the apparatus is set up to carry out a method comprising:
  periodically or continuously determining a geographic position of the vehicle,
  recording images using a first camera which is oriented to the front with respect to the vehicle,
  performing image recognition in an image region located in a region of the opposite lane, wherein the image recognition marks objects having a typical shape of traffic signs as candidates,
  estimating the time at which a candidate enters the capturing region of the second camera and the location in the image at which entry occurs;
  a second camera which is oriented to the rear with respect to the vehicle,
  means for performing traffic sign recognition for the images of the second camera, and
  means for storing information representing traffic signs and associated geographic positions,
wherein the apparatus is set up to perform a method comprising:
  recording images using the second camera which is oriented to the rear with respect to the vehicle,
  performing traffic sign recognition for the images of the second camera, and
  if a traffic sign has been recognized, storing information representing the recognized traffic sign and an associated geographic position in a database;
wherein estimating the time at which the candidate enters the capturing region of the second camera comprises:
  tracking the position of the candidate in the images of the first camera as the vehicle continues to approach the candidate, and
  determining a time of entry into the capturing region of the second camera from a speed of the vehicle and a steering angle of the vehicle, and from the optical properties of the first and of the second camera and the installation positions thereof in the vehicle.

8. The apparatus as claimed in claim 7, characterized in that the recording of images with the second camera and/or the performing of the traffic sign recognition for images of the second camera is operated or performed only from the time at which the candidate enters the capturing region of the second camera.

9. The apparatus as claimed in claim 7, characterized in that the actual placement site of a validated traffic sign is determined from the time during which the candidate was neither in the capturing region of the second camera nor in that of the first camera, the known optical properties of the first and of the second camera and the installation locations thereof in the vehicle, the driving speed, and the geographic positions of the vehicle ascertained during travel.

10. The apparatus as claimed in claim 7, characterized in that a display unit connected to the second camera reproduces no images of the second camera during forward travel of the vehicle.

11. The apparatus as claimed in claim 7, characterized in that the second camera is a camera provided for monitoring reverse travel of the vehicle.

* * * * *